Feb. 18, 1969            G. H. MOYES            3,427,807
CONNECTING MEMBER, E.G., FOR PIPES OR THE LIKE
Filed Nov. 6, 1967
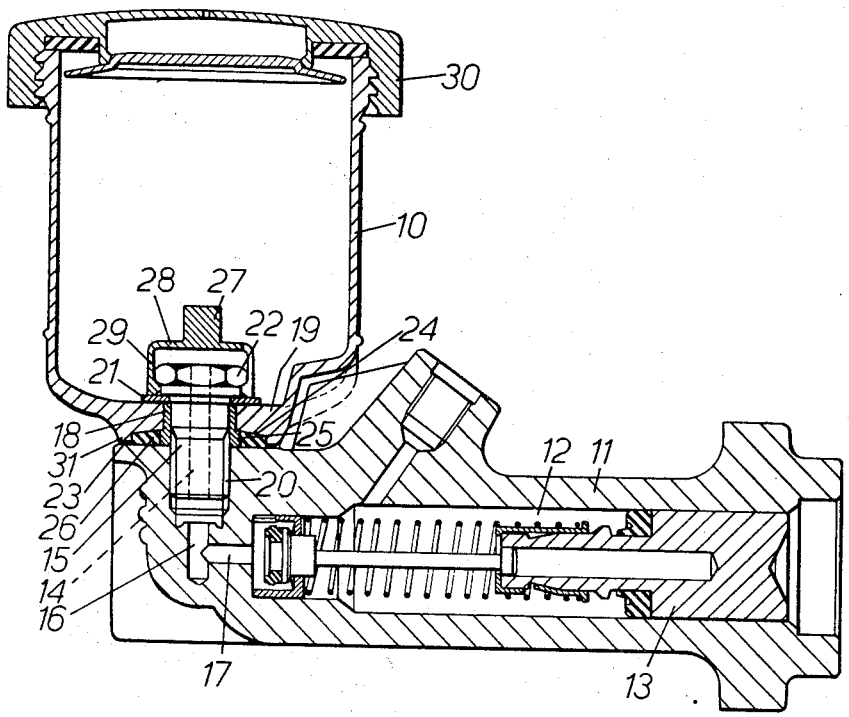

ns/United States Patent Office 3,427,807
Patented Feb. 18, 1969

3,427,807
CONNECTING MEMBER, E.G., FOR PIPES OR THE LIKE
Gordon Haswell Moyes, Sutton Coldfield, England, assignor to Girling Limited, Birmingham, England, a British company
Filed Nov. 6, 1967, Ser. No. 680,844
Claims priority, application Great Britain, Nov. 8, 1966, 49,864/66
U.S. Cl. 60—54.6          9 Claims
Int. Cl. F15b 7/08, 15/20

ABSTRACT OF THE DISCLOSURE

In a combined master cylinder and reservoir assembly the reservoir in the form of a nylon or like container is connected to the master cylinder by a bolt screwed into a tapped hole in the body or casing of the master cylinder, and means are included to ensure compression at the radially outer part of a resilient washer or gasket interposed between adjacent surfaces on the container and the body or casing.

---

This invention relates to means for making a connection between a nylon or like container and a member such as a body or casing or a master cylinder.

Nylon tends to flow under pressure and difficulty has been experienced in making a connection to a nylon reservoir or container which will remain fluid-tight under vibration.

According to our invention a nylon or like container is adapted to be connected to a body or casing of a master cylinder by a connection comprising a rigid or substantially rigid sleeve or bush which is adapted to be passed through an opening in the container into an opening in the body or casing in which it is secured, the material of the container being clamped between an annular shoulder on the sleeve or bush and an annular portion of the adjacent surface of the body or casing and a rubber or equivalent resilient washer or gasket is interposed between the annular portion of the surface of the body or casing and an annular portion of the adjacent surface of the container, either of the annular portions or both being inclined with respect to a plane normal to the axis of the sleeve or bush so that the axial diamensions of the annular space between them diminishes progressively in an outward direction and at least the outer part of the washer is compressed.

The washer or gasket in a free or unstressed condition is of rectangular cross-section so that the outer part of the washer or gasket is compressed to a greater degree than the inner part, which may even remain in the free or unstressed condition.

Preferably a spacer member is positioned between the annular portion of the adjacent surfaces of the container and the body or casing radially inwards from the inner part of the washer or gasket to limit the degree to which the washer or gasket can be compressed.

A combined master cylinder and reservoir assembly embodying a connection in accordance with our invention is shown in the accompanying drawings.

In the construction illustrated 10 is a container designed to form a reservoir for the working fluid of a hydraulically operated braking system or clutch. The reservoir is moulded from nylon or similar plastic. The container is mounted on the body or casing 11 of a master cylinder and, in the inoperative position shown, fluid from the reservoir enters a pressure space 12 in front of the piston 13 of the master cylinder through an axial bore 14 in a connecting sleeve or bush 15 and through radial and axial inlet passages 16, 17 in the casing 11. The sleeve or bush 15 is in the form of a bolt which is inserted from the interior of the reservoir through a sleeve 18 in an opening in a thickened wall portion 19 at the bottom of the reservoir. The bolt is screw-threaded into a tapped hole 20 in the body or casing of the master cylinder and a washer 21 is interposed between the head 22 of the bolt and the bottom of the reservoir. The material of the reservoir is thus clamped between an annular shoulder formed by the head 22 of the bolt and an annular portion of the adjacent surface 23 of the body or casing 11 of the master cylinder.

An annular recess 24 is formed in the outer surface of the bottom of the reservoir adjacent to the surface 23 of the body or casing 11 and the surface of the recess is inclined with respect to a plane normal to the axis of the bolt so that the axial dimensions of the recess 24 between this surface and the surface 23 become progressively less in an outward direction.

The sleeve 18 through which the bolt is passed is provided at its lower end with an annular shoulder portion 25 which is located in the annular recess 24. The shoulder portion is of a diameter greater than that of the opening in the container and is of axial length greater than the depth of the recess 24. An annular rubber or like resilient washer 26, which in its free or unstressed condition is of rectangular section, is located in the recess 24. The washer surrounds the shoulder portion 25, and is of a thickness at least equal to or greater than the axial length of the shoulder portion 25.

The radially outermost edge of the recess 24 is surrounded by a shrouding 31 integral with the reservoir and extending downwardly by a distance less than the axial length of the shoulder portion 25.

When the bolt 15 is tightened by screwing it into the tapped hole 20 to clamp the wall 19 of the reservoir between the head 22 of the bolt and the adjacent surface 23 of the master cylinder, the washer 26 is compressed to a predetermined degree when the shoulder portion 25 engages between the surface of the recess and the surface 23.

Deformation of the washer 26 in a radial direction beyond a predetermined amount is prevented by the engagement of the peripheral edge of the washer with the shrouding 31. The amount by which the washer is allowed to deform in a radial direction is consistent with the volume of the material of the washer which has to be accommodated due to the compression of the washer axially until the shoulder portion 25 engages between the surface of the recess and the surface 23 of the body or casing 11 of the master cylinder.

The reservoir 10 is thus effectively secured to the master cylinder in a fluid-tight manner without the application to the material of the reservoir of a compressive force liable to cause serious plastic flow of the nylon, by the annular shoulder portion 25 engaging with the reservoir over a small area.

The reservoir 10 embodies a shield or deflector 27 in the form of disc 28 mounted on the outer ends of three resilient legs 29 which are equally spaced angularly and which at their lower ends are a snug fit over the head 22 of the bolt 15. The shield or deflector 27 prevents injurious particles from falling into the axial bore of the bolt 15 which otherwise would pass into the master cylinder when a detachable closure cap 30 of the reservoir is removed.

In another construction the surface 23 of the master cylinder may be formed with an annular recess which is inclined with respect to a plane normal to the axis of the bolt so that the axial depth of the recess becomes progressively less in an outward direction. The washer is received in this recess and may engage with a flat annular surface on the bottom of the reservoir, or it may be located between this recess and a complementary recess formed in the bottom of the reservoir.

While our invention is primarily concerned with securing a container made of nylon, it can be employed for securing containers made of polythene or other plastic.

I claim:

1. In a combined master cylinder and reservoir assembly for an hydraulic system the reservoir is in the form of a plastic container connected to a body of the master cylinder by a connection comprising a substantially rigid sleeve adapted to be passed through an opening in the container into an opening in the body in which it is secured, an annular shoulder on the sleeve and an annular portion of the adjacent surface of the body or casing between which the material of the container is clamped, and a resilient washer interposed between said annular portion of the surface of said body and a complementary annular portion of the adjacent surface of said container, at least one of said annular portions being inclined with respect to a plane normal to the axis of said sleeve and being so constructed and arranged that the axial dimensions of the annular space between said portions diminishes progressively in an outward direction whereby at least the outer part of said washer is compressed.

2. A connection as claimed in claim 1, wherein said washer in a free or unstressed condition is of rectangular cross-section whereby the outer part of the washer is compressed to a greater degree than the inner part.

3. A connection as claimed in claim 1 wherein a spacer member is positioned between said annular portions of said adjacent surfaces of the container and body radially inwards from the inner part of said washer to limit the degree to which said washer can be compressed.

4. A connection as claimed in claim 3, wherein said radially outermost edge of said annular portion of said container is surrounded by a shrouding which extends downwardly by a distance less than the axial length of the spacer member and limits the degree by which the washer can be deformed radially.

5. A connection as claimed in claim 3, wherein said spacer member comprises an annular shoulder portion at one end of a sleeve extending through the opening in the container and through which the sleeve is passed.

6. A combined master cylinder and reservoir assembly, as claimed in claim 1 wherein communication between said container and a pressure space in said master cylinder is provided by an axial bore in the sleeve.

7. A connection as claimed in claim 1, wherein the sleeve comprises a bolt of which the stem is in screw-threaded engagement with the opening in the body of the master cylinder and the head forms the annular shoulder between which and the body is clamped the material of the container.

8. A combined master cylinder and reservoir assembly as claimed in claim 7, wherein a washer is interposed between the head of said bolt and the container.

9. A combined master cylinder and reservoir assembly as claimed in claim 7, wherein said container includes a shield in the form of a disc mounted on the outer ends of angularly spaced resilient legs adapted to fit over the head of said bolt.

References Cited

UNITED STATES PATENTS

| 3,218,806 | 11/1965 | Huffman et al. | 60—54.6 |
| 3,237,412 | 3/1966 | Ferrell | 60—54.6 |
| 3,390,524 | 7/1968 | Yardley et al. | 60—54.6 |

MARTIN P. SCHWADRON, *Primary Examiner.*

R. R. BUNEVICH, *Assistant Examiner.*

U.S. Cl. X.R.

285—158